H. H. HILL.
DETACHABLE HANDLE.
APPLICATION FILED AUG. 24, 1917.
1,300,836. Patented Apr. 15, 1919.
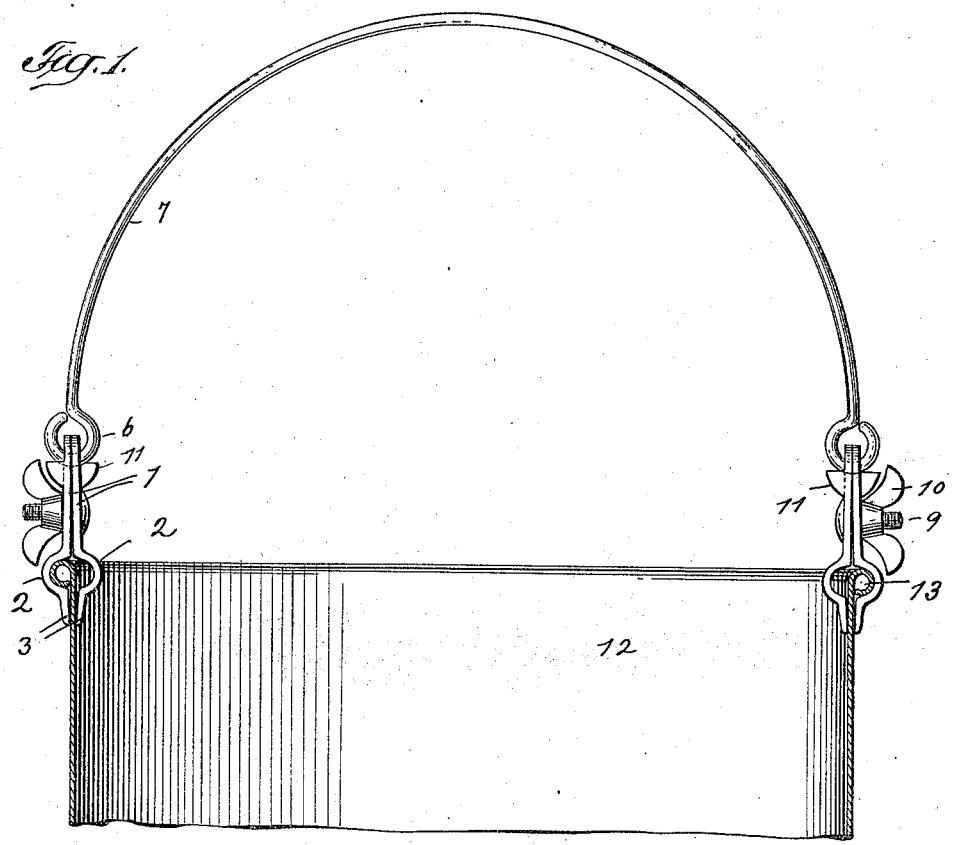
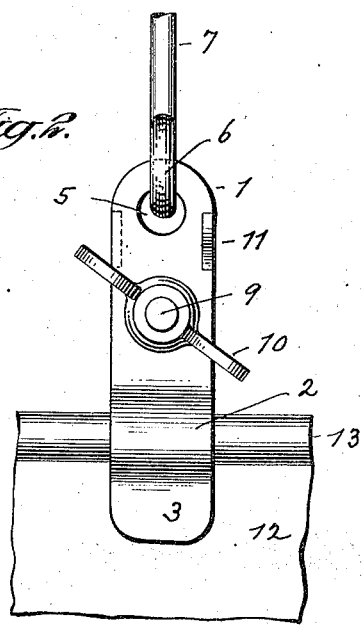
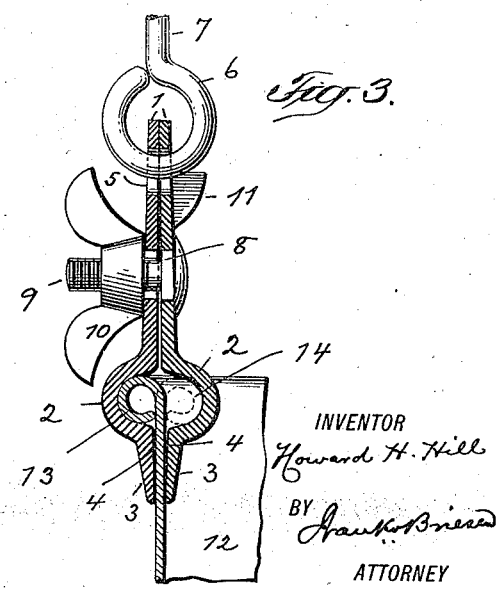
INVENTOR
Howard H. Hill
BY
ATTORNEY

UNITED STATES PATENT OFFICE.

HOWARD H. HILL, OF MONTCLAIR, NEW JERSEY.

DETACHABLE HANDLE.

1,300,836.  Specification of Letters Patent.  Patented Apr. 15, 1919.

Application filed August 24, 1917. Serial No. 187,938.

*To all whom it may concern:*

Be it known that I, HOWARD H. HILL, a citizen of Great Britain, and a resident of Montclair, in the county of Essex and State of New Jersey, have invented certain new and useful Improvements in Detachable Handles, of which the following is a specification.

This invention relates to a detachable handle for paint cans and other receptacles, and more particularly to a novel construction of the ears by which the handle is removably secured to said receptacles. Each of the ears is formed of a pair of twin members, adapted to engage either an inwardly or an outwardly extending bead or rim of the vessel, both of which constructions are frequently encountered. The members besides accommodating either variety of rim, are likewise adapted to obtain a firm hold on the body of the vessel, without requiring any perforation or other mutilation of the latter.

In the accompanying drawing:

Figure 1 is a side elevation of a detachable handle embodying my invention;

Fig. 2, a front view of one of the ears, and

Fig. 3, a longitudinal section thereof.

Each ear of the detachable handle is composed of a pair of twin members preferably made of cast steel and being slightly resilient.

Each of these members is formed of an upper elongated flat section 1, an intermediate bulged section 2, and a lower section or jaw 3, which merges into the bulged section and has a working face which is slightly flared as at 4. The upper section 1, is apertured near its top as at 5, for the accommodation of the eye 6 into which the end of the bail or handle 7 is coiled. Section 1, is further provided at a point somewhat below, with an additional aperture 8, which is preferably squared, and is adapted for the reception of the squared section of a bolt 9, carrying a winged nut 10. From each section 1 there further projects a lug 11 adapted to sustain the bail 7 in its horizontal position.

In assembling the parts, the two members of each ear are placed into facewise contact and in true alinement with each other, so that in this way, the bulged section 2 of one member will extend outward, while the bulged section of the other member will extend inward. The eye 6 of the bail is passed through the two alined upper apertures 5 and is closed so as to become permanently attached thereto, thus hingedly connecting the members to each other. The members are slipped over the rim of the container 12, so as to straddle the same, the bolt 9 is inserted through the alined apertures 8, and nut 10 is tightened up, so as to force the jaws 3 against the opposite faces of the container. Owing to the flared sections 4 of jaws 3, the inner working faces of the latter will converge somewhat from top to bottom, and thus by tightening up nut 10, the jaws will, by being slightly flexed, obtain a firm grip upon the container.

The upper rims of white lead kegs and similar vessels sometimes project outwardly as shown at 13, and sometimes project inwardly as indicated by dotted lines 14. With either construction, the handle may be readily fitted to the vessel, without requiring any further adjustment, an outwardly extending rim being accommodated within the bulged section of the outer member, while an inwardly extending rim is accommodated within the bulged section of the inner member.

It will be seen that the detachable handle constructed as described, is adapted for and may be firmly secured to either class of vessels, and that as both members of each ear are of like construction, they may be cast in the same mold or struck up from the same die, thus reducing cost of production.

I claim:

A detachable handle comprising a pair of members having upper apertured flat sections, oppositely extending bulged sections below the flat sections, and flexible jaws merging into the bulged sections, said jaws converging from top to bottom, an eyed bail engaging said flat sections, a bolt likewise engaging said flat sections, and a nut on the bolt that is adapted to draw said sections toward each other and to flex the jaws.

HOWARD H. HILL.

Copies of this patent may be obtained for five cents each, by addressing the "Commissioner of Patents, Washington, D. C."